(No Model.)
T. S. LINDSAY.
LIFTER FOR STOVES, &c.
No. 250,086. Patented Nov. 29, 1881.
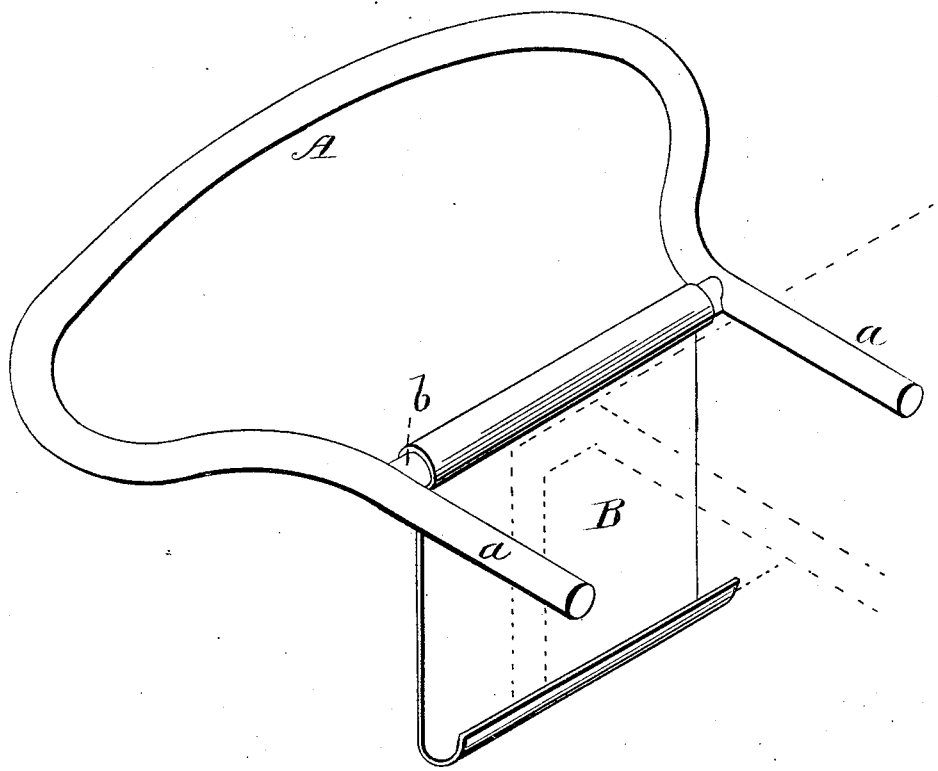

UNITED STATES PATENT OFFICE.

THOMAS S. LINDSAY, OF FORT EDWARD, NEW YORK.

LIFTER FOR STOVES, &c.

SPECIFICATION forming part of Letters Patent No. 250,086, dated November 29, 1881.

Application filed October 22, 1881. (No model.)

*To all whom it may concern:*

Be it known that I, THOMAS S. LINDSAY, a citizen of the United States, residing at Fort Edward, in the county of Washington and State of New York, have invented certain new and useful Improvements in Lifters for Stoves, Culinary Vessels, &c.; and I do hereby declare that the following is a full, clear, and exact description of the same, reference being had to the annexed drawing, making a part of this specification, and to the letters and figures of reference marked thereon.

The present invention has relation to certain new and useful improvements in lifters for stoves, culinary vessels, &c.; and the object thereof is to provide a simple and effective implement whereby a stove or culinary vessel of any great weight can be lifted and carried from place to place, as found necessary, and with comparatively little trouble. This object I attain by the construction substantially as shown in the drawing, and hereinafter described.

In the accompanying drawing, which represents a perspective view of my invention, A designates the handle, of metal, preferably of heavy wire, bent as shown, so as to present two extension-arms, *a*, braced by a cross-piece, *b*, which also serves as a pivotal bearing for a suitable claw, B, which is connected in any convenient manner, so as to allow the claw to loosely move upon its bearing.

In using the lifter the arms *a* rest upon the rim of the stove or vessel, while the claw B catches under the rim, and as the stove or vessel is raised its weight will cause the implement or device to firmly and securely grasp it, thereby enabling it to be conveniently lifted.

Having now fully described my invention, what I claim as new, and desire to secure by Letters Patent, is—

The lifting device or implement consisting of the handle A, bent, as shown, to form the extension-arms *a*, in combination with the cross-piece *b* and the pivoted claw B, constructed to operate substantially as and for the purpose set forth.

In testimony that I claim the above I have hereunto subscribed my name in the presence of two witnesses.

THOS. S. LINDSAY.

Witnesses:
C. E. PARTRIDGE,
AL STODDARD.